(12) United States Patent
Sorrentino et al.

(10) Patent No.: US 9,560,614 B2
(45) Date of Patent: Jan. 31, 2017

(54) DIRECT CONTROL SIGNALING IN A WIRELESS COMMUNICATION SYSTEM

(71) Applicant: Telefonaktiebolaget L M Ericsson (publ), Stockholm (SE)

(72) Inventors: Stefano Sorrentino, Solna (SE); Gino Luca Masini, Stockholm (SE); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 27 days.

(21) Appl. No.: 14/405,051

(22) PCT Filed: Aug. 8, 2014

(86) PCT No.: PCT/SE2014/050923
§ 371 (c)(1),
(2) Date: Dec. 2, 2014

(87) PCT Pub. No.: WO2015/020602
PCT Pub. Date: Feb. 12, 2015

(65) Prior Publication Data
US 2015/0382315 A1 Dec. 31, 2015

Related U.S. Application Data

(60) Provisional application No. 61/864,397, filed on Aug. 9, 2013.

(51) Int. Cl.
*H04W 56/00* (2009.01)
*H04W 4/08* (2009.01)
(Continued)

(52) U.S. Cl.
CPC ........ *H04W 56/001* (2013.01); *H04L 27/2662* (2013.01); *H04W 4/08* (2013.01);
(Continued)

(58) Field of Classification Search
None
See application file for complete search history.

(56) References Cited

U.S. PATENT DOCUMENTS 6,112,100 A 8/2000 Ossoinig et al.
8,391,131 B2 3/2013 Baldemair et al.
(Continued)

FOREIGN PATENT DOCUMENTS

FR  EP 2211581 A1 * 7/2010 ............. H04L 7/042
WO  2011130630 A1  10/2011
(Continued)

OTHER PUBLICATIONS

3rd Generation Partnership Project, "3rd Generation Partnership Project; Technical Specification Group Services and System Aspects; Feasibility study for Proximity Services (ProSe) (Release 12)", Technical Report, 3GPP TR 22.803 V12.2.0, Jun. 1, 2013, pp. 1-45, 3GPP, France.

(Continued)

*Primary Examiner* — Anh Ngoc Nguyen
(74) *Attorney, Agent, or Firm* — Coats & Bennett, PLLC

(57) ABSTRACT

A first wireless communication device (14-1) belongs to a first (12-1) of multiple groups (12) of wireless communication devices (14). Devices (14) in any given group (12) are synchronized to the same timing reference and devices (14) in different groups (12) are not synchronized to the same timing reference. The first device (14-1) receives a message that indicates, for each of one or more of the groups (12), a range of possible values for misalignment between the timing reference of that group (12) and a common timing reference. The range accounts for uncertainty in that misalignment. The first device (14-1) determines, based on the one or more ranges, intervals of times during which direct control signaling is expected to be received at the first device (14-1) from one or more devices (14) in one or more other (Continued)

groups (12-2, 12-3). The first device (14-1) then adjusts intervals of times during which it is configured to operate in an awake state to narrowly encompass the intervals of times during which the direct control signaling is expected to be received.

48 Claims, 8 Drawing Sheets

(51) Int. Cl.
| | |
|---|---|
| H04W 52/02 | (2009.01) |
| H04W 76/04 | (2009.01) |
| H04L 27/26 | (2006.01) |
| H04W 76/02 | (2009.01) |

(52) U.S. Cl.
CPC ..... *H04W 52/0216* (2013.01); *H04W 56/002* (2013.01); *H04W 76/048* (2013.01); *H04W 76/023* (2013.01)

(56) References Cited

U.S. PATENT DOCUMENTS

| | | | |
|---|---|---|---|
| 8,744,471 | B1 | 6/2014 | Cai et al. |
| 2004/0043797 | A1* | 3/2004 | Shostak ............ H04W 52/0216 455/574 |
| 2005/0075125 | A1 | 4/2005 | Bada et al. |
| 2006/0120379 | A1 | 6/2006 | Beshai |
| 2006/0120397 | A1 | 6/2006 | Kreiner et al. |
| 2006/0239333 | A1 | 10/2006 | Albert et al. |
| 2007/0005926 | A1 | 1/2007 | Kim |
| 2007/0153834 | A1 | 7/2007 | Qu et al. |
| 2008/0101281 | A1 | 5/2008 | Harris et al. |
| 2008/0144493 | A1 | 6/2008 | Yeh |
| 2008/0181127 | A1 | 7/2008 | Terry et al. |
| 2009/0103465 | A1 | 4/2009 | Chow et al. |
| 2009/0103501 | A1 | 4/2009 | Farrag et al. |
| 2010/0009675 | A1 | 1/2010 | Wijting |
| 2010/0317305 | A1 | 12/2010 | Sahlin |
| 2011/0268006 | A1 | 11/2011 | Koskela et al. |
| 2012/0120849 | A1 | 5/2012 | Kazmi et al. |
| 2012/0258706 | A1 | 10/2012 | Yu et al. |
| 2012/0258752 | A1 | 10/2012 | Liao |
| 2012/0306693 | A1 | 12/2012 | Edge |
| 2013/0022010 | A1 | 1/2013 | Qianxi et al. |
| 2013/0040673 | A1 | 2/2013 | Siomina et al. |
| 2013/0083675 | A1 | 4/2013 | Yamada |
| 2013/0148566 | A1 | 6/2013 | Doppler et al. |
| 2013/0150051 | A1 | 6/2013 | Van Phan et al. |
| 2013/0157656 | A1 | 6/2013 | Gao et al. |
| 2013/0188473 | A1 | 7/2013 | Dinan |
| 2014/0022986 | A1 | 1/2014 | Wu et al. |
| 2014/0105192 | A1 | 4/2014 | Park et al. |
| 2014/0162545 | A1 | 6/2014 | Edge |
| 2014/0204898 | A1 | 7/2014 | Yang et al. |
| 2014/0269642 | A1 | 9/2014 | Forenza et al. |
| 2014/0286215 | A1 | 9/2014 | Koc et al. |
| 2015/0181583 | A1 | 6/2015 | Siomina et al. |
| 2015/0215883 | A1* | 7/2015 | Zheng .................. H04W 52/30 455/426.1 |
| 2015/0289282 | A1 | 10/2015 | Phuyal et al. |
| 2016/0028572 | A1 | 1/2016 | Suzuki et al. |

FOREIGN PATENT DOCUMENTS

| | | |
|---|---|---|
| WO | 2011147462 A1 | 12/2011 |
| WO | 2013005972 A2 | 1/2013 |
| WO | 2013074015 A1 | 5/2013 |
| WO | 2013078901 A1 | 6/2013 |
| WO | 2014168573 A2 | 10/2014 |
| WO | 2015020603 A1 | 2/2015 |

OTHER PUBLICATIONS

3rd Generation Partnership Project, "3rd Generation Partnership Project; Technical Specification Group Radio Access Network; Evolved Universal Terrestrial Radio Access Network (E-UTRAN); X2 application protocol (X2AP) (Release 11)", Technical Specification, 3GPP TS 36.423 V11.5.0, Jun. 1, 2013, pp. 1-144, 3GPP, France.

Chen et al., "Time Hopping for Device-to-device Communication in LTE Cellular System", WCNC 2010 proceedings, 2010, pp. 1-6, IEEE Communications Society.

\* cited by examiner

DIRECT CONTROL SIGNALING IN A WIRELESS COMMUNICATION SYSTEM

RELATED APPLICATIONS

The present application claims benefit of U.S. Provisional Application 61/864,397, filed 9 Aug. 2013, the disclosure of which is incorporated herein by reference in its entirety.

TECHNICAL FIELD

The present application relates generally to method and apparatus in a wireless communication system, and specifically to method and apparatus for direct control signaling in such a system.

BACKGROUND

Device-to-device (D2D) communication is a well-known and widely used component of many existing wireless technologies, including ad hoc and cellular networks. Examples of device-to-device communication include Bluetooth and several variants of the IEEE 802.11 standards suite such as WiFi Direct. These systems operate in unlicensed spectrum.

Device-to-device communications as an underlay to cellular networks have been proposed as a means to take advantage of the proximity of communicating devices and at the same time to allow devices to operate in a controlled interference environment. Typically, it is suggested that such device-to-device communication shares the same spectrum as the cellular system, for example by reserving some of the cellular uplink resources for device-to-device purposes. Allocating dedicated spectrum for device-to-device purposes is a less likely alternative as spectrum is a scarce resource. Moreover, (dynamic) sharing between the device-to-device services and cellular services is more flexible and provides higher spectrum efficiency.

Devices that want to communicate, or even just discover each other, typically need to transmit various forms of control signaling directly between one another. Control signaling transmitted directly between devices (i.e., as device-to-device communication) is referred to herein as direct control signaling. One example of such direct control signaling is the so-called discovery signal (also known as a beacon signal). A discovery signal at least carries some form of identity and is transmitted by a device that wants to be discoverable by other devices. Other devices can scan for the discovery signal. Once the other devices have detected the discovery signal, they can take the appropriate action. For example, the other devices can try to initiate a connection setup with the device transmitting the discovery signal.

When multiple devices transmit direct control signaling (discovery signals or any other type of direct control signaling), the transmissions from the different devices may be time synchronized (mutually time-aligned) or unsynchronized. Synchronization could be obtained for example by receiving appropriate signals from an overlaid cellular network, or from a global navigation satellite system such as a global positioning system (GPS). Discovery signals transmitted by a device within a cell for instance are typically synchronized to a cell-specific reference signal transmitted by the cell. Even in unsynchronized deployments, it may be beneficial for different cells to synchronize to each other, maintaining a time resolution up to that obtainable from the backhaul. If the network time protocol (NTP) is the source of synchronization, typical synchronization drifts are in the order of +/−5 ms.

Unsynchronization could occur where discovery signals are transmitted between unsynchronized cells, carriers and/or public land mobile networks (PLMNs). According to ProSe requirements, wireless communication devices belonging to one cell need to be able to discover wireless communication devices camping on another cell. Additionally, the proximity wireless communication devices may camp on different PLMNs or different carriers. Where different cells, carriers, or PLMNs are unsynchronized, from a device-to-device communication perspective, there are no cell boundaries.

The ProSe Study Item recommends supporting device-to-device communication for out-of-network coverage wireless communication devices. In such case, different synchronization options are possible: wireless communication devices may synchronize to a global reference (e.g., GPS) which is in general different from the synchronization reference of deployed networks. Alternatively, wireless communication devices may operate in a fully asynchronous fashion (no synchronization reference). A further option is that clusters of wireless communication devices synchronize to a specific wireless communication device, such as a Cluster Head (CH). This CH provides local synchronization to its neighbor wireless communication devices. Different clusters are not necessarily synchronized.

Wireless communication devices may discover unsynchronized discovery signals on a given carrier (or subband) by searching for discovery signals in time over their configured/predefined resources. This can be done, e.g., by time domain correlation of the received signal with the discovery signal waveforms. This is similar to the way wireless communication devices search for cells in a long-term evolution (LTE) standard for wireless communication. LTE uses a primary synchronization signal (PSS) and a secondary synchronization signal (SSS).

Wireless communication devices may alternate between an awake state and a sleep state (i.e., discontinuous reception (DRX)). During a sleep state, the memory and clocks are active, but the wireless communication device is configured to not monitor for any direct control signaling. During an awake state (or wake up time), the device is configured to indeed monitor for direct control signaling. Not monitoring for direct control signaling during the sleep state reduces the device's power consumption.

SUMMARY

One or more embodiments herein recognize that unsynchronized direct control signaling between wireless communication devices threatens those devices with excessive power consumption. Indeed, the unsynchronized nature of the direct control signaling suggests that a device must monitor for direct control signaling from another device (i.e., remain in an awake state) over a long period of time in order to ensure that any such signaling is detected with acceptable latency. One or more embodiments herein, however, advantageously enable the device to monitor for unsynchronized direct control signaling without having to remain in an awake state for such a long period of time.

More particularly in this regard, embodiments herein include a first wireless communication device in a first one of multiple groups of wireless communication devices in a wireless communication system. The devices within any given group are synchronized to the same timing reference. By contrast, devices in different groups are not synchronized to the same timing reference.

In some embodiments, for instance, the groups correspond to different clusters of devices. Each cluster has a cluster head that is a device corresponding to the cluster and that assigns resources on which devices in the cluster are to transmit direct control signaling to other devices. In other embodiments, though, the groups correspond to different cells in a cellular communication system. Radio coverage for devices in respective cells are provided by radio network nodes.

Irrespective of whether the groups correspond to clusters or cells, the first device in some embodiments is configured to receive a message that indicates, for each of one or more of the groups, a range of possible values for misalignment between the timing reference of that group and a common timing reference, where such range accounts for uncertainty in that misalignment. Based on the one or more ranges indicated by this received message, the first device determines intervals of times during which direct control signaling is expected to be received at the first device from one or more other devices in one or more other groups. Having made this determination, the first device advantageously adjusts the intervals of times during which the first device is configured to operate in an awake state to narrowly encompass the intervals of times during which the direct control signaling is expected to be received. The first device in this regard monitors for direct control signaling from other devices when operating in the awake state, but does not monitor for such direct control signaling when operating in a sleep state. In some embodiments, for example, the device narrowly tailors its sleep times around the timing of potential inter-group direct control signaling reception, so as to maximize sleep time while avoiding missing inter-group direct control signaling.

Regardless, in one embodiment, the received message indicates the range of possible values for misalignment between the timing reference of a given group and the common timing reference, by indicating the maximum one of those possible values.

In one embodiment, the common timing reference is the timing reference of a certain one of the groups.

In one embodiment, the message indicates for at least one of the groups different ranges of possible values for misalignment between the timing reference of that group and the common timing reference. These different ranges are associated with different resources configured for transmitting control signaling directly between devices.

In other embodiments, the first device is configured to autonomously estimate the intervals of time during which such direct control signaling is expected to be received, instead of or in conjunction with receiving the message above. In one embodiment, for example, the first device is configured to receive direct control signaling from a second device in a second one of the groups. Based on reception of this direct control signaling, the first device estimates the intervals of time during which direct control signaling is expected to be received at the first device from devices in the second group. The first device then adjusts the intervals of time during which the first device is configured to operate in the awake state (for receiving direct control signaling from the second group) to narrowly encompass these determined intervals of time, as described previously.

In some embodiments, this estimation entails identifying the direct control signaling received from the second device as having been received from a device in the second group, based on extracting an identity of the second group from the direct control signaling. The first device then derives a timing reference, or range of possible timing references, of this second group from the timing with which the direct control signaling was received from the second device. Finally, the estimation is performed based on an assumption that devices in the second group transmit direct control signaling according to the derived timing reference, or range of possible timing references.

In one or more embodiments, the estimation comprise determining a range of possible values for misalignment between the timing references of the first and second groups, with this range accounting for uncertainty in that misalignment. This range is determined in some embodiments for example, based on one or more of: (i) a margin of error allowed for devices in the first or second group to be considered as synchronized to the same timing reference; (ii) inherent propagation delay between a radio node associated with the first or second group and devices in that group; and (iii) inherent propagation delay between devices in different groups. At least a portion of the range of possible values for misalignment may be determined based on a communication protocol employed for communication in and/or between the different groups.

Irrespective of how the above-mentioned intervals of time are determined or estimated, the adjusting herein comprises in some embodiments shortening the intervals of time during which the first device is configured to operate in the awake state as compared to before the first device determined or estimated the intervals of times during which the direct control signaling is expected to be received.

In one or more embodiments, the first device, as a result of the adjusting, preferentially operates in the sleep state during intervals of time when the direct control signaling is not expected to be received at the first device.

In some embodiments, the first device transitions to a sleep state earlier than nominally configured according to the adjusting. The first device does so responsive to receiving and decoding direct control signaling during an interval of time when the first device is in an awake state.

In at least one embodiment, the first device occasionally or periodically extends the intervals of time during which it is nominally configured to operate in the awake state according to the adjusting, such that those intervals of time no longer narrowly encompass the intervals of times during which the direct control signaling is expected to be received. But, when direct control signaling is received during the extended intervals of time, the first device re-adjusts the intervals of time during which it is configured to operate in the awake state to narrowly encompass the intervals of time during which the direct control signaling is expected to be received, accounting for the direct control signaling received during the extended intervals of time.

In still other embodiments, the first device is nominally configured according to the adjusting to operate in an awake state during a periodically recurring time resource that narrowly encompasses the intervals of times during which it expects to receive direct control signaling. Responsive to determining that no direct control signaling has been detected on the time resource for a defined amount of time, the first device increases the periodicity of the time resource. But, responsive to detecting that direct control signaling has been restarted on that time resource, the first device decreases the periodicity of that time resource.

Embodiments herein further include corresponding apparatus, computer programs, carriers, and computer program products.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
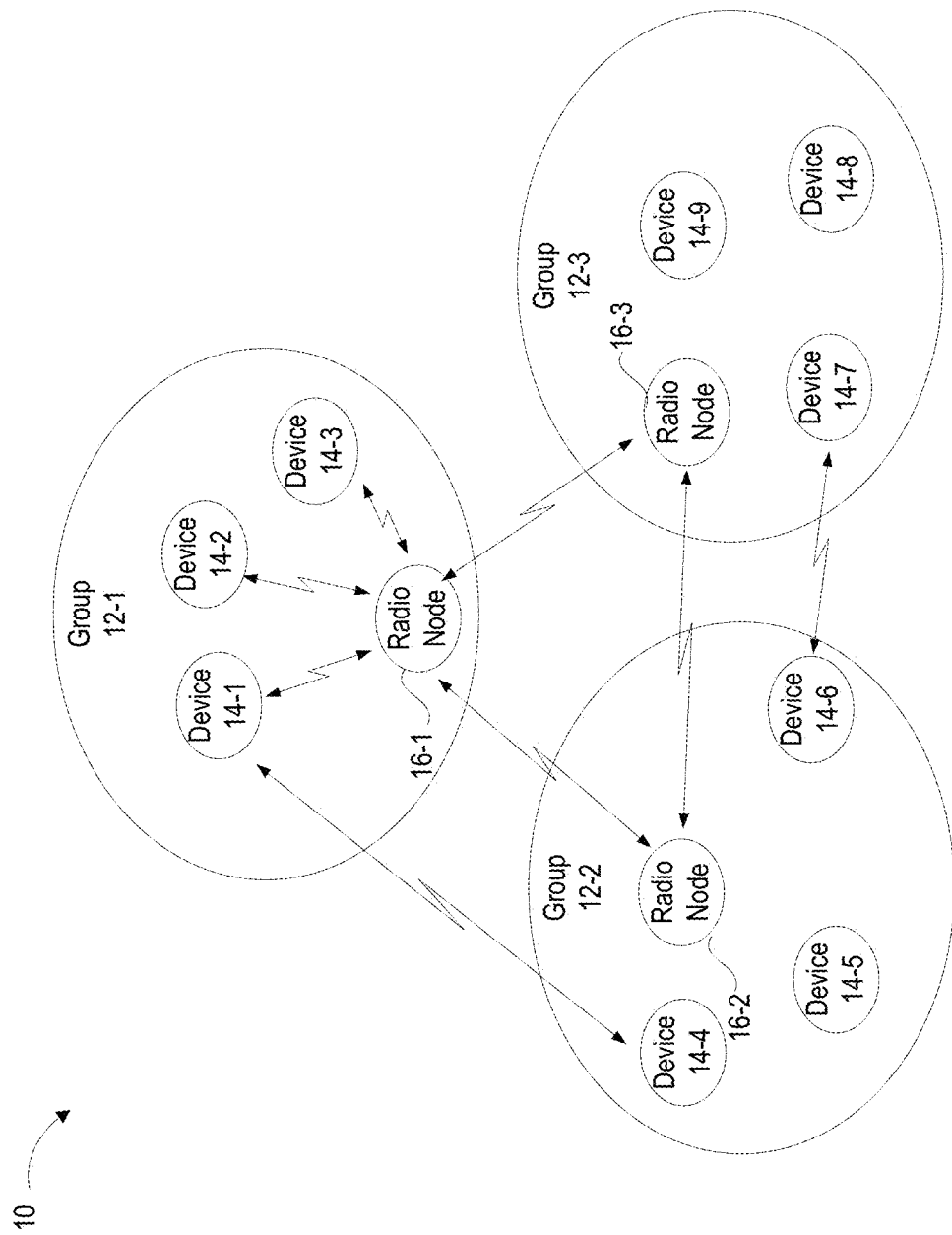
FIG. 1 is a block diagram of a wireless communication system according to one or more embodiments that includes multiple groups of wireless communication devices.

FIG. 1 shows a wireless communication system 10 comprising multiple groups 12 of wireless communication devices 14. More specifically, FIG. 1 illustrates as an example one group 12-1 of three devices 14-1 through 14-3, another group 12-2 of three devices 14-4 through 14-6, and yet another group 12-3 of three devices 14-7 through 14-9. The devices 14 within any given group 12 are synchronized to the same timing reference, at least within a predefined "acceptable" margin of error. Synchronized in this way, the devices 14 within any given group 12 time their transmission and reception according to this same timing reference. Devices 14 in different groups 12, by contrast, are not synchronized to the same timing reference, meaning that the timing references of different groups 12 (and thereby the transmission and reception timing of different groups 12) are at risk of being misaligned.

A radio node 16 is associated with each group 12. As shown, for instance, radio node 16-1 is associated with group 12-1, radio node 16-2 is associated with group 12-2, and radio node 16-3 is associated with group 12-3. A radio node 16 as used herein is configured to transmit and receive radio signals, and to control one or more devices 12 within its associated group 12 in some capacity (e.g., by controlling the timing reference used by the group 12).

In some embodiments, for example, the different groups 12 correspond to different cells in a cellular communication system. In this case, the radio nodes 16 in FIG. 1 are radio network nodes (e.g., base stations) that provide radio coverage for the devices 12 in their respective cells. This case is therefore also appropriately referred to herein as a network (NW) coverage case, where the devices 14 are within the coverage of a wireless communication network and communicate with the network via the radio network nodes providing radio coverage for respective cells.

Figure 2:
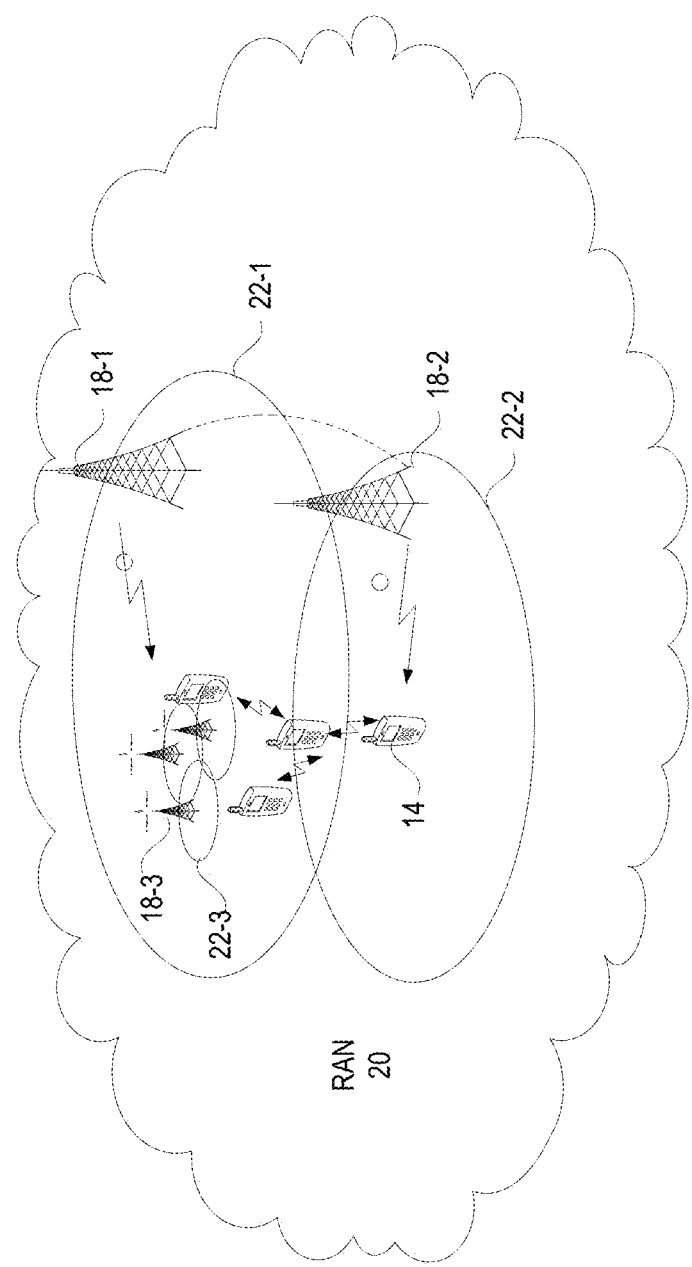
FIG. 2 is a block diagram of a radio access network that includes multiple cells corresponding to the groups in FIG. 1, according to one or more embodiments.

FIG. 2 broadly illustrates this network coverage case by illustrating wireless communication devices 14 being within the radio coverage of radio network nodes 18 (e.g., base stations) in a radio access network 20. The cells 22 provided by these radio network nodes 18 correspond to the groups 12 in FIG. 1, and may correspond to different cells 22 of the same public land mobile network (PLMN), different carrier, or different PLMN. Devices 14 located in the same cell 22 (camping on the same cell 22) are synchronized to the same timing reference and typically derive that synchronization from the downlink in that cell 22. This ensures that transmissions from different devices 14 are time synchronized and, consequently, reception at a given device 14 is roughly synchronized. The timing difference is proportional to the distance and could be absorbed by the cyclic prefix in orthogonal frequency-division multiplexing (OFDM) for instance. In any event, the network coverage case assumes that devices 14 at issue are sufficiently close to one another in order to communicate directly with one another, e.g., via device-to-device communication, irrespective of whether the devices 14 are served by different radio network nodes 18. Such assumption often proves true, for instance, in heterogeneous networks that employ macro radio network nodes as well as pico, micro, etc. radio network nodes.

In other embodiments, the different groups 12 in FIG. 1 correspond to different clusters of devices 14 that are synchronized to the same timing reference. This may be the case for instance where devices 14 are either not configured to communicate with any wireless communication network (or are simply not within the coverage of such a network), but the devices 14 within any given cluster are nonetheless within communication range of each other for device-to-device communication. In this case, which is also appropriately referred to herein as the lack of network coverage case, the radio nodes 16 in FIG. 1 are so-called cluster heads. A cluster head as used herein is a wireless communication device 14 that not only belongs to a group 12 of devices 14, but also controls the devices 14 in that group 12 in some capacity; that is, the cluster head acts as the head of a cluster of devices 14 that are synchronized to the same timing reference. The cluster head in some embodiments for instance has special control authority to assign the "direct control" resources on which devices 14 in the cluster are to transmit direct control signaling to other devices 14. That is, rather than the devices 14 themselves autonomously deciding on which resources to transmit direct control signaling (e.g., possibly within a subset of preconfigured resources, such as a certain subband), the cluster head makes such decision on behalf of the cluster as a whole. The cluster head alternatively or additionally controls the devices 14 in a group 12 by controlling the timing reference used by that group 12.

Irrespective of whether the groups 12 in FIG. 1 constitute cells or clusters, devices 14 transmit so-called direct control signaling with other devices 14 in the same or a different group 12. Direct control signaling in this regard refers to control signaling transmitted directly between devices 14, i.e., as device-to-device (D2D) communication that does not involve any intermediate nodes. One example of such direct control signaling is a so-called discovery signal (also known as a beacon signal) that a device 14 transmits in order to be discovered by other devices 14 in proximity. Any embodiments herein focusing on such discovery signals are equally applicable to other types of direct control signaling unless indicated otherwise. In at least some embodiments, a radio node 16 for a group 12 configures resources for transmission of direct control signaling, such as discovery signals, according to a periodic, regular, sparse in time, or otherwise predefined pattern. The time (and possibly frequency) resources for direct control signaling transmission/reception in any given group 12 are defined with respect to the timing reference of that group 12. With devices 14 in any given group timing their transmission and reception according to the same timing reference, direct control signaling between those devices 14 is synchronized in nature. By contrast, since devices 14 in different groups 12 time their transmission and reception according to different timing references, direct control signaling between devices 14 in different groups 12 is unsynchronized in nature.

In the interest of power efficiency, any given wireless communication device 14 operates in either an awake state or a sleep state according to an awake-sleep state cycle (e.g., DRX cycle). In the awake state, a device 14 monitors for direct control signaling from other devices 14, such as by turning on one or more receivers. In a sleep state, by contrast, a device 14 does not monitor for such direct control signaling, such as by turning off one or more receivers. Correspondingly, a device 14 conserves more power when operating in a sleep state than when operating in an awake state. The unsynchronized nature of inter-group direct control signaling, however, threatens a device's ability to conserve power in this way.

A device 14 according to one or more embodiments herein however monitors for inter-group direct control signaling in a power-efficient manner despite the unsynchronized nature of such signaling. In this regard, any given device 14 nominally transmits and monitors for direct control signaling according to the timing reference of its group 12. This would otherwise suggest that the device 14 must monitor for inter-group direct control signaling over a long period of time (since the device 14 otherwise has no information about when to expect that inter-group control signaling due to its unsynchronized nature). One or more embodiments herein advantageously enable the device 14 to monitor for unsynchronized direct control signaling without having to remain in an awake state for such a long period of time.

Figure 3:
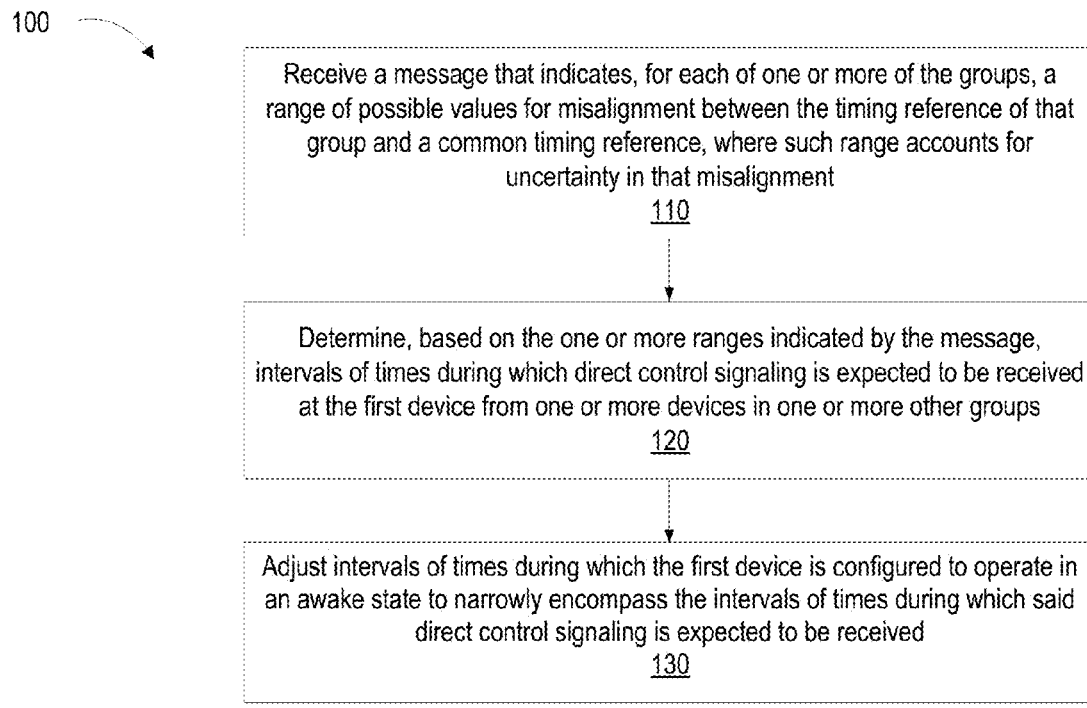
FIG. 3 is a logic flow diagram of a method performed by a first wireless communication device according to one or more embodiments.

FIG. 3 for example illustrates embodiments that enable a device 14 to do this by providing the device 14 with a particular kind of message. Specifically in this regard, a first wireless communication device 14-1 in group 12-1 is configured to implement the method 100 shown in FIG. 3, according to one or more embodiments. The first device 14-1 is configured to receive a particular message (Block 110), e.g., from the radio node 16-1 (i.e., base station or cluster head) associated with the device's group 12-1. This particular message indicates, for each of one or more of the groups 12, a range of possible values for misalignment between the timing reference of that group 12 and a common timing reference, where such range accounts for uncertainty in that misalignment. In some embodiments, the common timing reference is the timing reference of a certain group 12, meaning that the message directly indicates the range of possible misalignment between different groups' timing references. In other embodiments, the common timing reference is an absolute timing reference (e.g., a global or universal timing reference divorced from any group 12). In this case, the message still indicates the range of possible misalignment between different groups' timing references, but the message indicates this only indirectly via the absolute timing reference or in conjunction with other information. In either case, therefore, the message provides information effective for the first device 14-1 to determine a range of possible timing misalignment between different groups 12 (e.g., between group 12-1 and group 12-2 and/or between group 12-1 and group 12-3), accounting for uncertainty in that misalignment. Where the groups 12 correspond to cells 22, for instance, the message in at least some embodiments includes an indication of the synchronization error/inaccuracy between the serving cell and other cells in proximity, whose devices 14 are transmitting direct control signaling of interest.

Regardless, the first device 14-1 is further configured to determine, based on the one or more ranges indicated by the received message, intervals of times during which direct control signaling is expected (or likely) to be received from one or more devices 12 in one or more other groups 12 (i.e., group 12-2 and/or group 12-3) (Block 120). That is, the first device 14-1 determines from the indicated range(s) that, if a device (e.g., device 14-4) in a different group (e.g., group 12-2) transmits such direct control signaling, that signaling should be received at the first device 14-1 within the determined intervals of time, given the range of possible synchronization misalignment between the groups at issue (e.g., groups 12-1 and 12-2). In any event, having made this determination, the first device 14-1 adjusts the intervals of times during which it is configured to operate in an awake state to narrowly encompass the intervals of times during which the direct control signaling is expected (or likely) to be received (Block 130). In some embodiments, for example, the first device 14-1 preferentially operates in the sleep state during intervals of time when, according to the above determination, no inter-group direct control signaling is expected or likely to be received. This effectively conserves device power while still ensuring acceptable latency in detecting inter-group direct control signaling.

In at least a general sense, the message that the first device 14-1 receives in FIG. 3 effectively describes the unsynchronized nature of inter-group direct control signaling in the system 10, accounting for uncertainty in that unsynchronized nature. The information in this sense effectively makes the device 14-1 aware of the set of resources in time where direct control signaling (e.g., discovery signals) are expected, even from devices in other (e.g., neighboring) groups 12. The first device 14-1 according to FIG. 3 advantageously exploits this information about the signaling's unsynchronized nature in order to more narrowly tailor the timing of its direct control signaling monitoring (e.g., awake-sleep state cycle or DRX cycle) to the timing of potential direct control signaling reception.

In some embodiments, the received message indicates a range of possible values for misalignment between the timing reference of a given group 12 and a common timing reference, by indicating the maximum one of those possible values. That is, the range is indicated in terms of the maximum possible timing misalignment (e.g., with a minimum possible timing misalignment being known or predefined). Where the groups 12 correspond to cells 22, for instance, the timing range may describe the maximum timing misalignment between cells 22 in proximity.

No matter the particular implementation, though, the message notably indicates the timing misalignment range, as opposed to a single timing alignment offset, in order to account for one or more sources of uncertainty in the misalignment. In some embodiments, one such source of uncertainty originates from the margin of error allowed for devices 14 in the same group 12 to be considered as synchronized to the same timing reference. Indeed, this margin of error effectively allows a range of possible values for misalignment between the actual timing references used by devices 14 in the same group 12. The timing misalignment range indicated by the message encompasses and otherwise accounts for this margin of error.

Alternatively or additionally, another source of uncertainty originates from inherent propagation delay between a group's radio node 16 (e.g., base station or cluster head) and the devices 14 in that group 12. Indeed, this propagation delay affects a device's perception of the group's timing reference to an unknown extent.

As yet another example, another source of uncertainty originates from inherent propagation delay between devices 14 in different groups 12. This unknown propagation delay affects a device's perception of the extent of misalignment between the groups' timing references.

The sources of uncertainty accounted for by the message are of course not limited to the above examples. That is, in general, one or more embodiments herein envision that the one or more ranges of misalignment indicated by the message account for any or all sources of such uncertainty, including those not explicitly outlined by the above examples.

Figure 4:
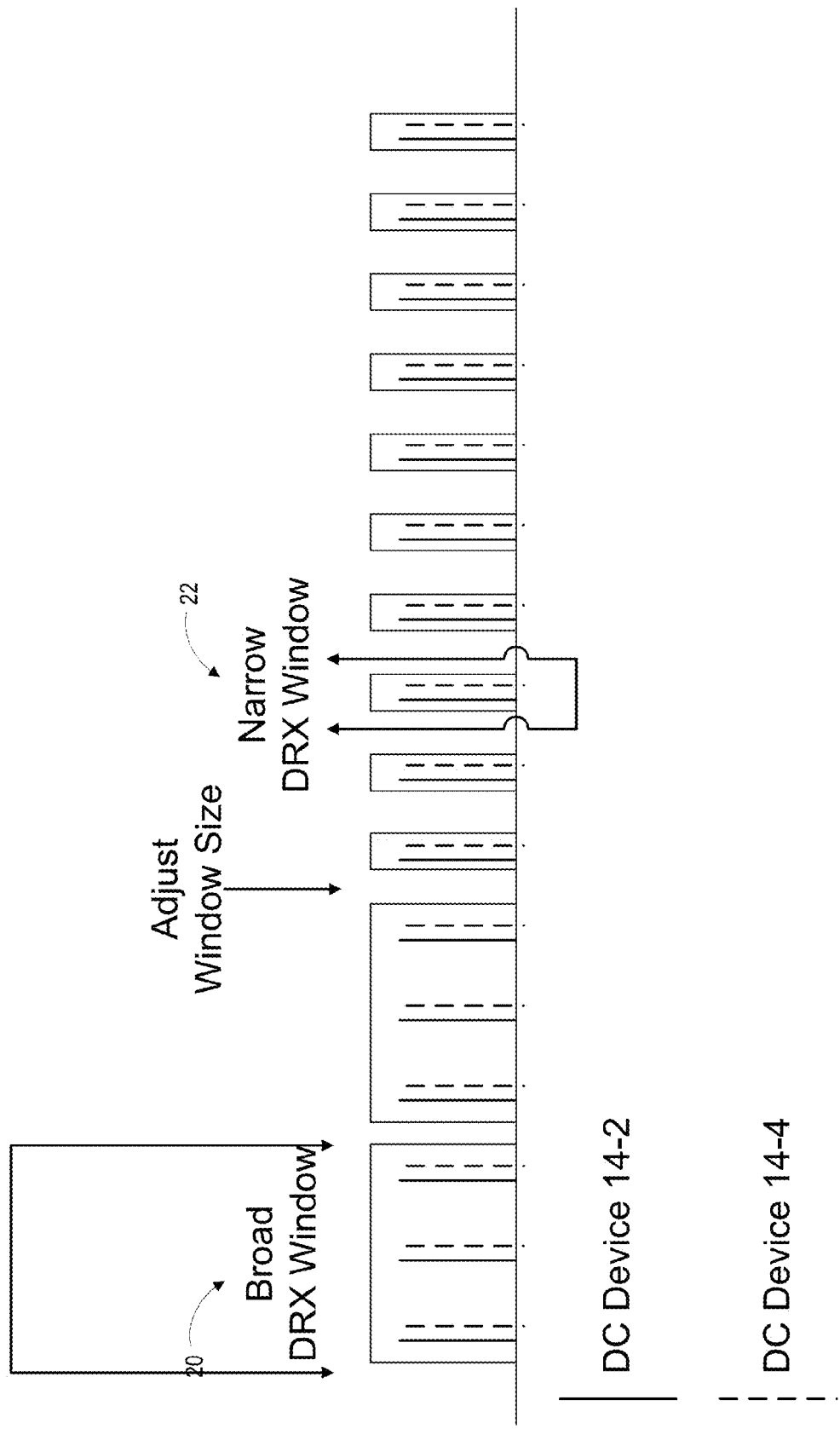
FIG. 4 illustrates an example of how the first wireless communication device adjusts the intervals of time it is configured to operate in an awake state, according to one or more embodiments.

With an understanding of this uncertainty, the first device 14-1 according to some embodiments advantageously shortens the intervals of time during which it is configured to operate in the awake state, e.g., as compared to before the first device 14-1 determined the intervals of time during which direct control signaling is expected to be received. Consider for example the awake-sleep state (i.e., DRX) cycle shown in FIG. 4. As shown, the awake state timing of the cycle has been adjusted by the first device 14-1 from a more power-inefficient timing 20 in which the device 14-1 operates in the awake state for long periods of time to a more power-efficient timing 22 in which the device 14-1 operates in the awake state for shorter periods of time. Indeed, rather than having its awake state time intervals (referred to here as the "DRX Windows") broadly encompass times during which direct control signaling would have to be received under the most conservative of possibilities, the first device 14-1 adjusts its DRX window size to narrowly encompass intervals of times during which direct control signaling is expected (or likely) to be received (e.g., from device 14-2 in group 12-1 and device 14-4 in group 12-2). That is, the device 14-1 adjusts its DRX period such that it is awake during the DC windows and asleep during the remaining time, for the purpose of direct control signaling reception. Of course, the device 14-1 may still wake up during other periods for performing different operations than direct control signaling reception, but by doing so the device 14-1 is awake for receiving direct control signaling only for the intervals of time when such direct control signaling is expected to be received. These intervals of time, as described above, notably account for uncertainty in the timing misalignment between groups 12-1 and 12-2. Where the groups 12 in FIG. 1 correspond to cells 22, for instance, the width of the DC windows may depend on the synchronization margin and/or synchronization accuracy between cells 22, and can be on the order of +/− some milliseconds. In any event, this means that there will still be some inherent power inefficiency in the first device's inter-group signaling monitoring (i.e., the DRX window may still be longer than it would have been had there been absolute certainty in the timing misalignment). But the above awake state timing adjustment reduces this power inefficiency in some embodiments to the extent possible given this uncertainty.

In the interest of reducing this uncertainty and thereby increasing power efficiency, a wireless communication device 14 according to one or more other embodiments herein autonomously estimates the intervals of time during which inter-group direct control signaling is expected (or likely) to be received, instead of or in conjunction with receiving the message above. A first wireless communication device 14-1 according to some embodiments therefore is a "smart" device that alternatively or additionally implements the method 200 shown in FIG. 5.

Figure 5:
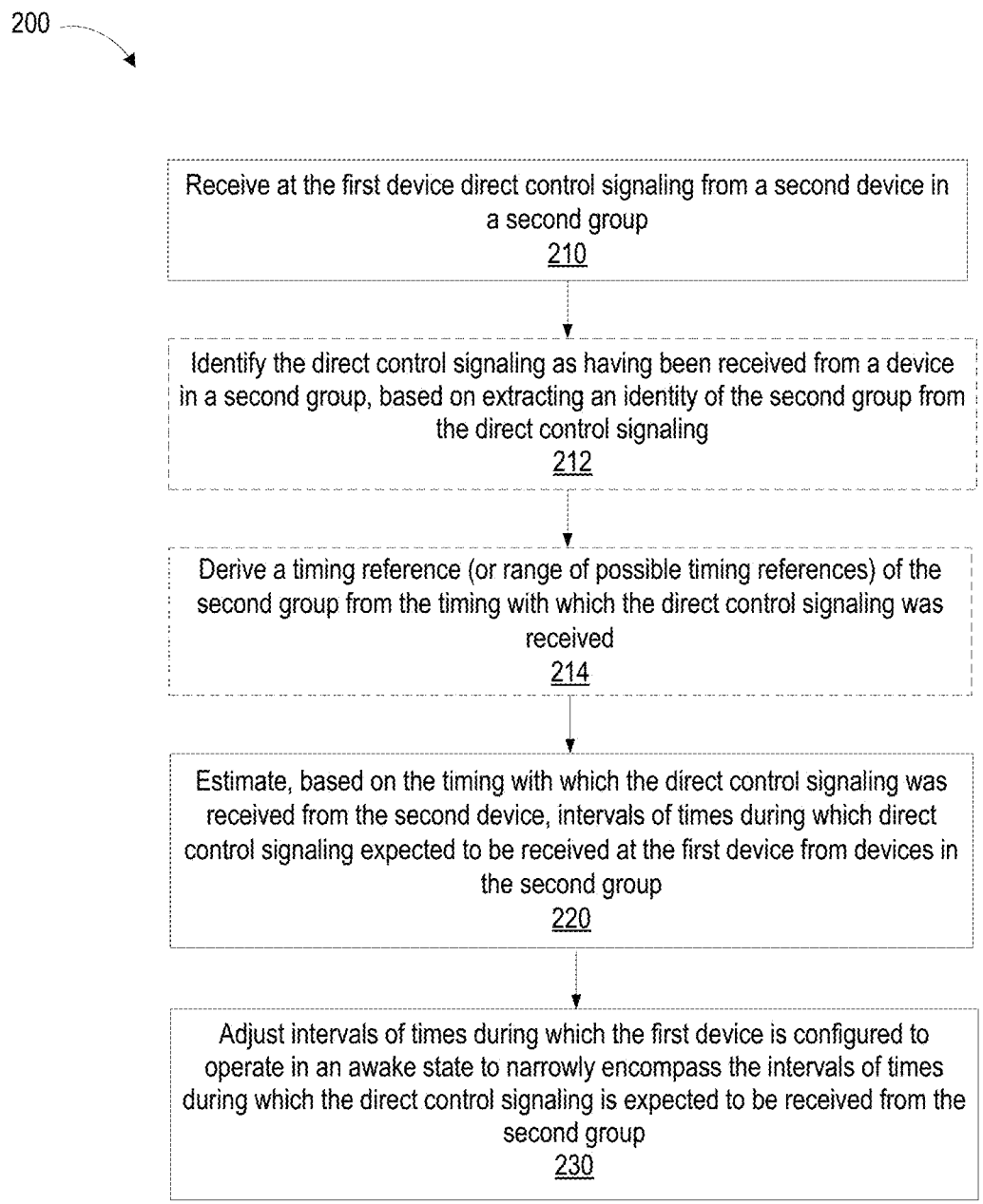
FIG. 5 is a logic flow diagram of a method performed by a first wireless communication device according to one or more other embodiments.

As shown in FIG. 5, the first device 14-1 receives direct control signaling from a second device 14-4 in a second group 12-2 (Block 210). The first device estimates, based on the timing with which the direct control signaling was received from the second device 14-4, intervals of times during which the first device 14-1 expects to receive direct control signaling from devices 14 in the second group 12-2 (Block 220). Similar to embodiments above, the first device 14-1 then adjusts the intervals of times during which it is configured to operate in an awake state (for receiving signaling from the second group 12-2) to narrowly encompass the intervals of times during which the direct control signaling is expected to be received from the second group 12-2 (Block 230).

In general, therefore, the first device 14-1 estimates the timing of direct control signaling reception for a given group 12 based on when it successfully detected direct control signaling from one or more devices 14 within that group 12. In one embodiment, for example, the first device 14-1 successfully detects at least some direct control signaling from devices (e.g., device 14-4) belonging to a given group 12. The first device 14-1 then estimates the timing associated with that given group 12 and shortens its receiver window around the expected reception timing instances (e.g., in a way similar to that shown in FIG. 4). By autonomously estimating the correct timing for different groups (e.g., cells or clusters) based on actual direct control signaling reception, the reception windows in FIG. 5 may be narrower than the ones that the ones attained in FIG. 3.

As shown in FIG. 5, the first device 14-1 in some embodiments exploits group identity information conveyed by direct control signaling in order to accomplish the above described estimation. Specifically, the first device 14-1 in these embodiments identifies direct control signaling as having been received from the second device 14-4 in a particular group, i.e., Group 12-2, based on extracting an identity of that group (e.g., a cell identity, PLMN identity, and/or cluster identity) from the direct control signaling (Block 212). This approach of course relies on devices 14 to transmit information about their group identity in order to assist other devices 14 in associating their group with the correct timing. In any event, having accomplished this identification, the first device 14-1 then derives a timing reference (or range of possible timing references) of the particular group 12-2 from the timing with which the direct control signaling was received (Block 214). Based on the assumption that devices 14 in the particular group 12-2 transmit direct control signaling according to the derived timing reference, the first device 14-1 advantageously estimates the intervals of time during which direct control signaling is expected to be received at the first device 14-1 from the devices 14 in the particular group 12-2.

In at least some embodiments, the above estimation delays operation in a power-efficient awake-sleep state until sufficient direct control signaling is received for estimating the timing reference at issue. In this sense, then, the autonomous estimation approach proves less power-efficient than the signaling approaches described with respect to FIG. 3. However, the above estimation in some embodiments provides more certainty in the timing misalignment between groups 12, meaning that the wireless device 14-1 more narrowly tailors its awake-sleep state timing to the potential direct control signaling reception as compared to that performed in the signaling approaches. Indeed, in at least some embodiments, the first device 14-1 performs its estimation in Block 220 of FIG. 5 by itself determining a range of possible values for misalignment between the timing references of the first and second groups 12-1, 12-2, with the range accounting for uncertainty in that misalignment as described above. That is, the first device 14-1 itself effectively estimates or otherwise characterizes the uncertainty by taking into account one or more of the sources of uncertainty mentioned above. For example, in one embodiment, the first device 14-1 itself determines the range of possible values for the misalignment based on one or more of (i) a margin of error allowed for devices 14 in the first or second group 12-1, 12-2 to be considered as synchronized to the same timing reference; (ii) inherent propagation delay between a radio node 16 associated with the first or second group 12-1, 12-2 and the devices 14 in that group; and (iii) inherent propagation delay between devices 14 in different groups 12. The first device 14-1 may for instance in some embodiments determine a portion of the range of misalignment attributable to any given source of uncertainty based on one or more parameters associated with communication in and/or between the groups 12 at issue (e.g., the communication protocol employed).

Irrespective of whether the autonomous estimation approach of FIG. 5 or the signaling approach of FIG. 3 is employed, the first device 14-1 in some embodiments implements certain other features in order to further conserve power and/or to ensure direct control signaling reception. In one or more embodiments, for example, the first device 14-1 further conserves power by transitioning to a sleep state earlier than nominally configured to according to the adjusted awake-sleep state cycle, responsive to direct control signaling detection/decoding. Specifically, the first device 14-1 in some embodiments receives and decodes direct control signaling during an interval of time when the first device 14-1 is in an awake state. Despite the first device 14-1 still being nominally configured to be in the awake state (i.e., according to the narrowly tailored awake-sleep state cycle), the first device 14-1 makes an early transition to the sleep state upon such direct control signaling decoding, based on an assumption or knowledge that no further direct control signaling is expected to be received. For example, once the first device 14-1 has correctly decoded any direct control signaling within the DC window, it turns into sleeping mode even though the DC window is not expired yet. This is because the corresponding direct control signaling has already been received and there is no need for the first device 14-1 to keep awake and consume battery for that DC window instance (e.g., corresponding to a certain discovery instance where the direct control signaling is a discovery signal). Regardless, it least in some embodiments, this early transition to the sleep state does not otherwise affect the nominally configured awake-sleep state cycle of the first device 14-1.

According to one or more other embodiments, the first device 14-1 occasionally or periodically extends the intervals of times during which it is nominally configured to operate in an awake state, so that those intervals of time are no longer narrowly tailored as described above. The first device 14-1 does this in the interest of subsequently updating its narrow tailoring of awake time intervals. Indeed, when direct control signaling is received during those extended intervals of time, the first device 14-1 re-adjusts the intervals of time during which it is configured to operate in an awake state to narrowly encompass the intervals of time during which the direct control signaling is expected to be received, accounting for the direct control signaling received during those extended intervals of time. This way, the first device 14-1 does not miss direct control signaling from new groups 12 of devices 14 that have come within communication range since the first device's last narrow tailoring of its awake time intervals (which did not account for such new groups 12).

Indeed, once the reception window has been shortened according to, e.g., one of the embodiments above, the first device 14-1 risks missing new direct control signaling that falls outside the narrow reception window. This can be the case, e.g., when the first device 14-1 moves in proximity of new cells or clusters. In order to avoid such problem, as just described, the first device 14-1 periodically or occasionally performs a longer search for direct control signaling based on a longer wake up time. During such wake up time the first device 14-1 is likely to be able to acquire timing for all or at least most devices 14 in proximity that are transmitting direct control signaling. The longer wake up time in some embodiments that involve discovery signaling for instance corresponds approximately to a full discovery cycle where all devices 14 involved in discovery transmit their discovery signals at least once. Once the timing for such devices 14 is acquired, the DRX window in some embodiments is shortened accordingly.

Figure 6:
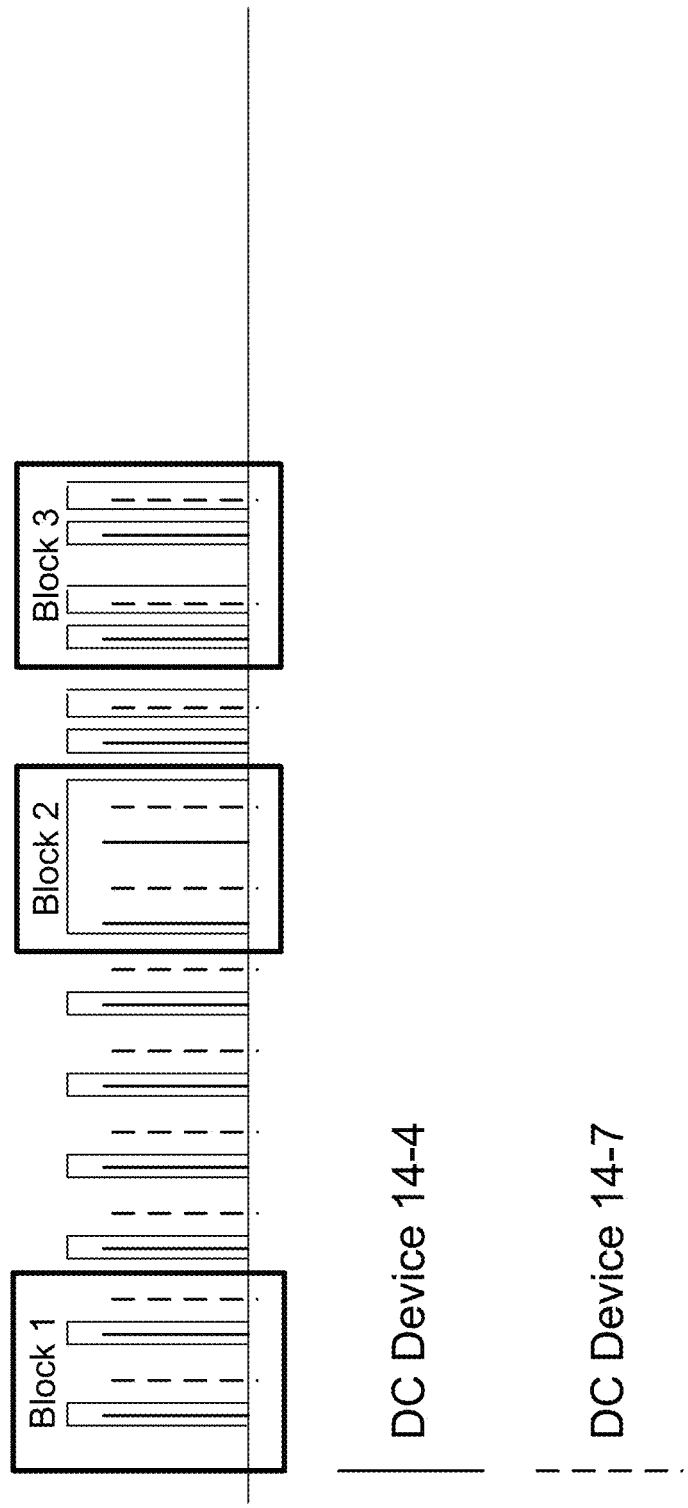
FIGS. 6 and 7 illustrate examples of how the first wireless communication device adjusts the intervals of time it is configured to operate in an awake state, according to one or more other embodiments.

Consider the example in FIG. 6. As shown in Block 1, the first device 14-1 initially tailored its awake time intervals to the expected timing of direct control signaling received from device 14-4 in group 12-2. Since doing so, however, the first device 14-1 has come within communication range of group 12-3, of which device 14-7 is assumed here to be a member. In order to ensure that the first device 14-1 detects direct control signaling in such a situation, the first device 14-1 is configured to occasionally or periodically perform a longer awake (DRX) cycle, as shown in Block 2. During such a longer awake cycle, the first device 14-1 detects direct control signaling from device 14-7 with a different timing (since device 14-7 belongs to a different group than device 14-4). Thereafter, of course, the first device 14-1 narrowly tailors its awake (DRX) cycles around the expected direct control signaling reception timing of both Groups 12-2 and 12-3 (i.e., for devices 14-4 and 14-7). As shown in Block 3, for example, the first device 14-1 in some embodiments is configured to even operate in a sleep state between the expected reception windows for groups 12-2 and 12-3 (e.g., in an aperiodic fashion).

Still one or more other embodiments under certain circumstances drop at least some of the time intervals during which the first device 14-1 is nominally configured to operate in an awake state. These embodiments prove advantageous for instance when, due to mobility and other reasons, devices 14 may cease to be in proximity or may stop transmitting direct control signaling. In this case, it would be a waste of energy for the receiving device 14 to keep monitoring resources where no device 14 is transmitting anymore.

According to these embodiments, therefore, the first device 14 is nominally configured to operate in an awake state during a periodically recurring time resource that narrowly encompasses the intervals of times during which the first device 14-1 expects to receive direct control signaling. Responsive to determining that no direct control signaling has been detected on that time resource for a defined amount of time, the first device 14-1 increases the periodicity of the time resource. That is, the interval between the periodic occurrences of that time resource (i.e., the interval between the periodic occurrences of the DRX window instances) is increased, rather than completely dropping monitoring of that resource, just in case direct control signaling on that resource is restarted. Indeed, responsive to detecting that direct control signaling has been restarted on the time resource, the first device 14-1 decreases the periodicity of the time resource again.

Figure 7:
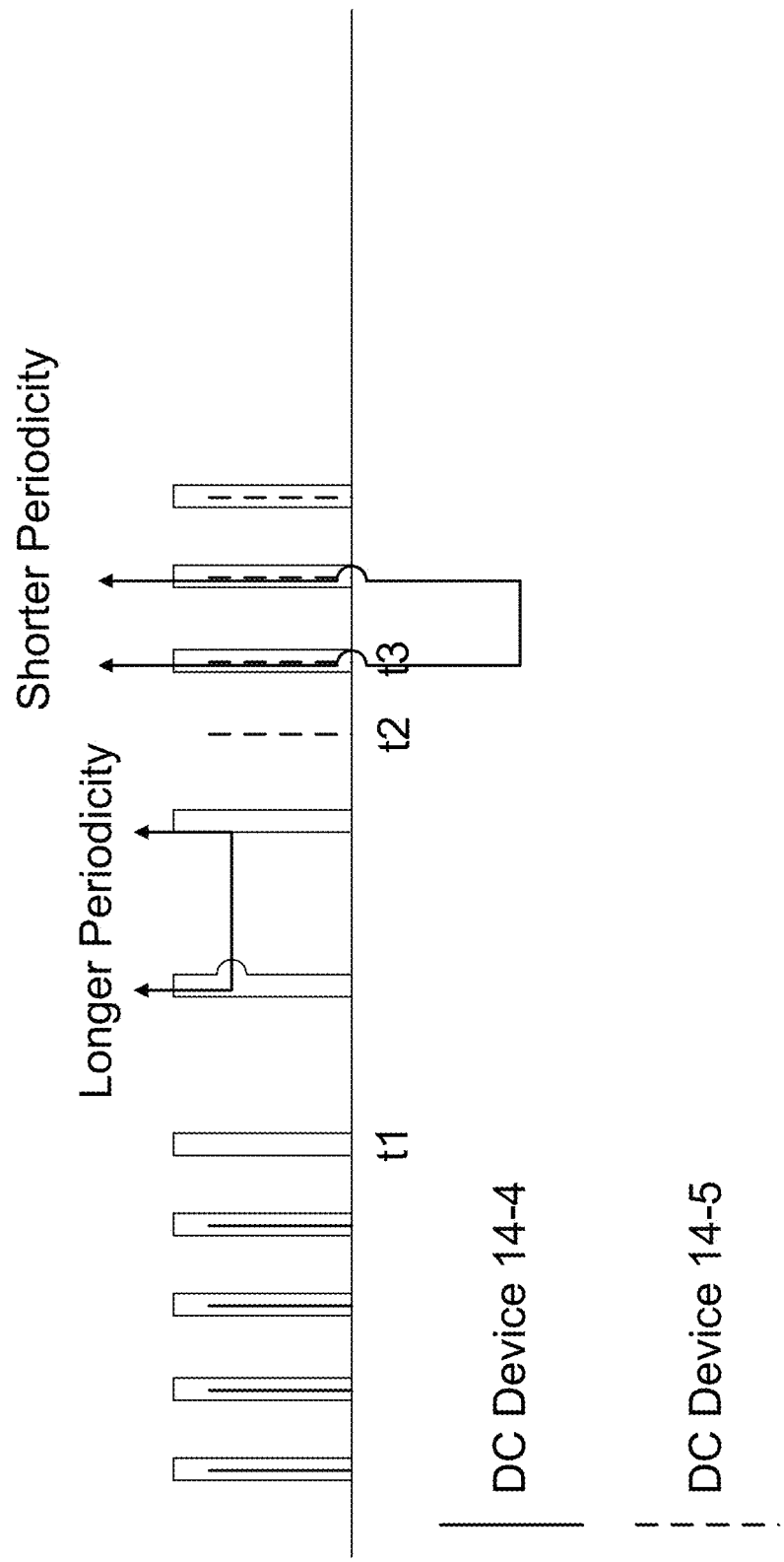

FIG. 7 illustrates these embodiments with a simple example. As shown, the first device 14-1 is nominally configured to operate in an awake state during a periodically recurring time resource that narrowly encompasses the intervals of times during which the first device 14-1 expects to receive control signaling from devices in group 12-2, including as shown device 14-4. At time t1, the first device 14-1 determines that no direct control signaling has been detected on this time resource. Responsive to this, the first device 14-1 increases the periodicity of the time resource (i.e., so that it has a longer periodicity as shown). Eventually, at time t2, another device 14-5 in group 12-2 begins transmitting direct control signaling. The first device 14-1 misses the first direct control signaling transmission at time t2 because the first device 14-1 is conserving power with the longer periodicity. However, at time t3, the first device 14-1 detects device 14-5's direct control signaling transmission and resumes its shorter periodicity as before.

One particular implementation of such embodiments involves the first device 14-1 resetting a timer whenever direct control signaling is detected corresponding to a certain timing instance and DRX window. If the timer exceeds a certain value before new direct control signaling is detected within the same DRX window (i.e., no DC signaling has been detected within the DRX window for a certain time), the interval between DRX windows is increased. This is to save device power and to ensure that it is possible to detect if activity is restarted on that resource after some time. If activity restarts, the monitoring interval, i.e. the interval between DRX windows is decreased again in some embodiments.

Note that, in one or more embodiments, there may be different ranges of possible values for misalignment between the timing reference of a group and the common timing reference. These different ranges may for instance be associated with different resources configured for transmitting direct control signaling between devices.

Figure 8:
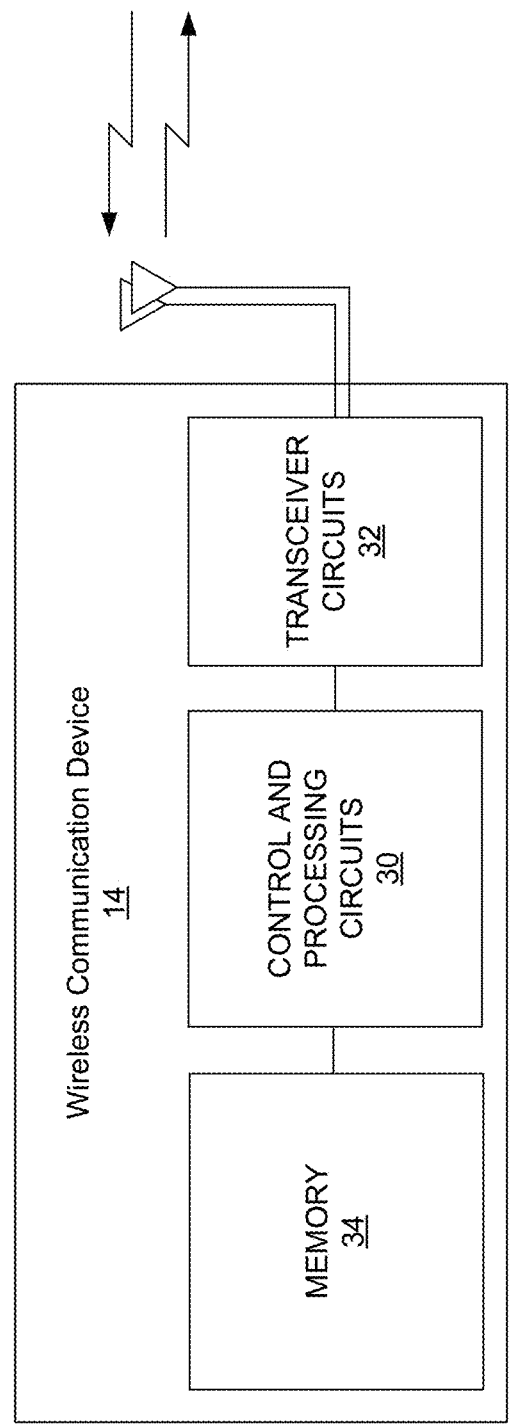
FIG. 8 is a block diagram of a first wireless communication device according to one or more embodiments.

In view of the above modifications and variations, FIG. 8 shows an example embodiment of a wireless communication device 14. The wireless communication device 14 comprises one or more processing circuits 30 configured to perform the method in FIG. 3 and/or FIG. 5. The wireless communication device 14 also includes one or more radio transceiver circuits 32 configured to both transmit and receive radio signals. The one or more radio transceiver circuits 32, for example, includes various radio-frequency components (not shown) to receive and process radio signals from other radio nodes, via one or more antennas, using known signal processing techniques. Notably, the one or more radio transceiver circuits 32 are also configured to directly transmit and receive radio signals to/from other wireless communication devices 14, e.g., via device-to-device communication.

The wireless communication device 14 in some embodiments further comprises one or more memories 34 for storing software to be executed by, for example, the one or more processing circuits 30. The software comprise instructions to enable the one or more processing circuits 30 to perform the method as shown in FIG. 3 and/or FIG. 5. The memory 34 may be a hard disk, a magnetic storage medium, a portable computer diskette or disc, flash memory, random access memory (RAM) or the like. Furthermore, the memory 34 may be an internal register memory of a processor.

Of course, not all of the steps of the techniques described herein are necessarily performed in a single microprocessor or even in a single module. Thus, a more generalized control circuit configured to carry out the operations described above may have a physical configuration corresponding directly to the processing circuit(s) 30 or may be embodied in two or more modules or units. The wireless communication device 14 may for instance include different functional units, each configured to carry out a particular step of FIGS. 3 and/or FIG. 5.

Those skilled in the art will also appreciate that embodiments herein further include a corresponding computer program. The computer program comprises instructions which, when executed on at least one processor of a wireless communication device 14, cause the device 14 to carry out any of the processing described above. Embodiments further include a carrier containing such a computer program. This carrier may comprise one of an electronic signal, optical signal, radio signal, or computer readable storage medium. Those skilled in the art will appreciate that such a computer program according to some embodiments comprises one or more code modules contained in memory 34, each module configured to carry out a particular step of FIGS. 3 and/or FIG. 5.

As used herein, the term "wireless communication device" 14 is any device configured to communicate wirelessly with another node and to communicate directly with another such wireless communication device 14 (i.e., via device-to-device communication). A wireless communication device 14 therefore includes a user equipment (UE), a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities, a machine-to-machine device, or the like.

Also as used herein, the term "radio network node" refers to a radio node that is part of a radio access network 20. A radio network node, for example, includes an eNB in LTE, a control node controlling one or more remote radio units (RRUs), a radio base station 16, an access point, or the like. The radio network node in some embodiments is configured to operate over a so-called system bandwidth. A portion of this system bandwidth in some embodiments in reserved, statically or dynamically, for D2D communication. Hence, a DC bandwidth is available for assignment to for example DC messages.

Further, as used herein, a timing reference includes any reference in the time domain that functions as a common source for time-domain synchronization. A timing reference may include for instance the timing of a defined transmission or reception window. In LTE, for example, such includes the timing of an LTE subframe in some embodiments.

Still further, different direct control signaling resources herein in some embodiments have the same timing window widths. In other embodiments, though, different direct control signaling resources are associated with different timing windows widths.

Those skilled in the art will also appreciate that the various "circuits" described may refer to a combination of analog and digital circuits, including one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. Moreover, the above embodiments are able to be implemented independently or in combination with one another. The present embodiments are thus to be considered in all respects as illustrative and not restrictive.

What is claimed is:

1. A method implemented by a first wireless communication device in a first one of multiple groups of wireless communication devices in a wireless communication system, where devices in any given group are synchronized to the same timing reference and devices in different groups are not synchronized to the same timing reference, the method comprising:
   receiving a message that indicates, for each of one or more of the groups, a range of possible values for misalignment between the timing reference of that group and a common timing reference, the range accounting for uncertainty in that misalignment;
   determining, based on the one or more ranges indicated by the message, intervals of times during which direct control signaling is expected to be received at the first device from one or more devices in one or more other groups; and
   adjusting intervals of times during which the first device is configured to operate in an awake state to narrowly encompass the intervals of times during which the direct control signaling is expected to be received;
   wherein the first device operates in either the awake state or a sleep state, and wherein in the awake state and the sleep state the first device respectively does and does not monitor for direct control signaling from other devices.

2. The method of claim 1, wherein the message indicates the range of possible values for misalignment between the timing reference of a given group and the common timing reference, by indicating the maximum one of those possible values.

3. The method of claim 1, wherein the common timing reference is the timing reference of a certain one of the groups.

4. The method of claim 1:
   wherein the message indicates for at least one of the groups different ranges of possible values for misalignment between the timing reference of that group and the common timing reference; and
   wherein the different ranges are associated with different resources configured for transmitting control signaling directly between devices.

5. The method of claim 1, wherein the adjusting comprises shortening the intervals of time during which the first device is configured to operate in the awake state as compared to before the first device determined or estimated the intervals of times during which the direct control signaling is expected to be received.

6. The method of claim 1, further comprising, as a result of the adjusting, preferentially operating the first device in the sleep state during intervals of time when the direct control signaling is not expected to be received at the first device.

7. The method of claim 1, further comprising transitioning the first device to a sleep state earlier than nominally configured according to the adjusting, responsive to receiving and decoding direct control signaling during an interval of time when the first device is in the awake state.

8. The method of claim 1, further comprising:
   occasionally or periodically extending the intervals of time during which the first device is nominally configured to operate in the awake state according to the adjusting, such that those intervals of time no longer narrowly encompass the intervals of times during which the direct control signaling is expected to be received; and
   when direct control signaling is received during the extended intervals of time, readjusting the intervals of time during which the first device is configured to operate in the awake state to narrowly encompass the intervals of time during which the direct control signaling is expected to be received, accounting for the direct control signaling received during the extended intervals of time.

9. The method of claim 1:
   wherein, according to the adjusting, the first device is nominally configured to operate in an awake state during a periodically recurring time resource that narrowly encompasses the intervals of times during which the first device expects to receive direct control signaling; and
   further comprising:
      responsive to determining that no direct control signaling has been detected on the time resource for a defined amount of time, increasing the periodicity of the time resource; and
      responsive to detecting that direct control signaling has been restarted on the time resource, decreasing the periodicity of the time resource.

10. The method of claim 1, wherein the groups correspond to different clusters of devices, each cluster having a cluster head that is a device belonging to the cluster and that assigns resources on which the devices in the cluster are to transmit direct control signaling to other devices.

11. The method of claim 1, wherein the wireless communication system comprises a cellular communication system, the system including radio network nodes that provide radio coverage for devices in respective cells, wherein the groups correspond to different cells in the system.

12. A method implemented by a first wireless communication device in a first one of multiple groups of wireless communication devices in a wireless communication system, where devices in any given group are synchronized to the same timing reference and devices in different groups are not synchronized to the same timing reference, the method comprising:
   receiving direct control signaling from a second device in a second one of the groups;
   estimating, based on the timing with which the direct control signaling was received from the second device, intervals of times during which direct control signaling is expected to be received at the first device from devices in the second group; and
   adjusting intervals of times during which the first device is configured to operate in an awake state to narrowly encompass the intervals of times during which the direct control signaling is expected to be received from devices in the second group;
wherein the first device operates in either the awake state or a sleep state, and wherein in the awake state and the sleep state the first device respectively does and does not monitor for direct control signaling from other devices.

13. The method of claim 12, wherein the estimating comprises:
identifying the direct control signaling received from the second device as having been received from a device in the second group, based on extracting an identity of the second group from the direct control signaling;
deriving a timing reference, or range of possible timing references, of the second group from the timing with which the direct control signaling was received from the second device; and
performing the estimating based on an assumption that devices in the second group transmit direct control signaling according to the derived timing reference, or range of possible timing references.

14. The method of claim 12, wherein the estimating comprises determining a range of possible values for misalignment between the timing references of the first and second groups, the range accounting for uncertainty in that misalignment.

15. The method of claim 14, wherein the determining is performed based on one or more of:
a margin of error allowed for devices in the first or second group to be considered as synchronized to the same timing reference;
inherent propagation delay between a radio node associated with the first or second group and the devices in that group; and
inherent propagation delay between devices in different groups.

16. The method of claim 15, wherein the determining comprises determining a portion of the range of possible values for misalignment based on a communication protocol employed for communication in and/or between the different groups.

17. The method of claim 12, wherein the adjusting comprises shortening the intervals of time during which the first device is configured to operate in the awake state as compared to before the first device determined or estimated the intervals of times during which the direct control signaling is expected to be received.

18. The method of claim 12, further comprising, as a result of the adjusting, preferentially operating the first device in the sleep state during intervals of time when the direct control signaling is not expected to be received at the first device.

19. The method of claim 12, further comprising transitioning the first device to a sleep state earlier than nominally configured according to the adjusting, responsive to receiving and decoding direct control signaling during an interval of time when the first device is in the awake state.

20. The method of claim 12, further comprising:
occasionally or periodically extending the intervals of time during which the first device is nominally configured to operate in the awake state according to the adjusting, such that those intervals of time no longer narrowly encompass the intervals of times during which the direct control signaling is expected to be received; and
when direct control signaling is received during the extended intervals of time, readjusting the intervals of time during which the first device is configured to operate in the awake state to narrowly encompass the intervals of time during which the direct control signaling is expected to be received, accounting for the direct control signaling received during the extended intervals of time.

21. The method of claim 12:
wherein, according to the adjusting, the first device is nominally configured to operate in an awake state during a periodically recurring time resource that narrowly encompasses the intervals of times during which the first device expects to receive direct control signaling; and
further comprising:
responsive to determining that no direct control signaling has been detected on the time resource for a defined amount of time, increasing the periodicity of the time resource; and
responsive to detecting that direct control signaling has been restarted on the time resource, decreasing the periodicity of the time resource.

22. The method of claim 12, wherein the groups correspond to different clusters of devices, each cluster having a cluster head that is a device belonging to the cluster and that assigns resources on which the devices in the cluster are to transmit direct control signaling to other devices.

23. The method of claim 12, wherein the wireless communication system comprises a cellular communication system, the system including radio network nodes that provide radio coverage for devices in respective cells, wherein the groups correspond to different cells in the system.

24. A first wireless communication device for use in a wireless communication system that includes multiple groups of wireless communication devices, wherein when devices are included in the same group the devices are synchronized to the same timing reference and when devices are included in different groups the devices are not synchronized to the same timing reference, wherein the first wireless communication device comprises:
processing circuitry and a memory, the memory containing instructions executable by the processing circuitry whereby the first wireless communication device, when in a first one of the groups, is configured to:
receive a message that indicates, for each of one or more of the groups, a range of possible values for misalignment between the timing reference of that group and a common timing reference, the range accounting for uncertainty in that misalignment;
determine, based on the one or more ranges indicated by the message, intervals of times during which direct control signaling is expected to be received at the first device from one or more devices in one or more other groups; and
adjust intervals of times during which the first device is configured to operate in an awake state to narrowly encompass the intervals of times during which the direct control signaling is expected to be received;
wherein the first device is configured to operate in either the awake state or a sleep state, and wherein in the awake state and the sleep state the first device respectively does and does not monitor for direct control signaling from other devices.

25. A first wireless communication device for use in a wireless communication system that includes multiple groups of wireless communication devices, wherein when devices are included in the same group the devices are synchronized to the same timing reference and when devices are included in different groups the devices are not synchronized to the same timing reference, wherein the first wireless communication device comprises:

processing circuitry and a memory, the memory containing instructions executable by the processing circuitry whereby the first wireless communication device, when in a first one of the groups, is configured to:
receive direct control signaling from a second device in a second one of the groups;
estimate, based on the timing with which the direct control signaling was received from the second device, intervals of times during which direct control signaling is expected to be received at the first device from devices in the second group; and
adjust intervals of times during which the first device is configured to operate in an awake state to narrowly encompass the intervals of times during which the direct control signaling is expected to be received from devices in the second group;
wherein the first device is configured to operate in either the awake state or a sleep state, and wherein in the awake state and the sleep state the first device respectively does and does not monitor for direct control signaling from other devices.

26. A computer program product stored in a non-transitory computer readable medium for controlling a first wireless communication device in a first one of multiple groups of wireless communication devices in a wireless communication system, where devices in any given group are synchronized to the same timing reference and devices in different groups are not synchronized to the same timing reference, the computer program product comprising software instructions which, when run on one or more processors of the first wireless communication device, causes the first wireless communication device to:
receive a message that indicates, for each of one or more of the groups, a range of possible values for misalignment between the timing reference of that group and a common timing reference, the range accounting for uncertainty in that misalignment;
determine, based on the one or more ranges indicated by the message, intervals of times during which direct control signaling is expected to be received at the first device from one or more devices in one or more other groups; and
adjust intervals of times during which the first device is configured to operate in an awake state to narrowly encompass the intervals of times during which the direct control signaling is expected to be received;
wherein the first device operates in either the awake state or a sleep state, and wherein in the awake state and the sleep state the first device respectively does and does not monitor for direct control signaling from other devices.

27. A computer program product stored in a non-transitory computer readable medium for controlling a first wireless communication device in a first one of multiple groups of wireless communication devices in a wireless communication system, where devices in any given group are synchronized to the same timing reference and devices in different groups are not synchronized to the same timing reference, the computer program product comprising software instructions which, when run on one or more processors of the first wireless communication device, causes the first wireless communication device to:
receive direct control signaling from a second device in a second one of the groups;
estimate, based on the timing with which the direct control signaling was received from the second device, intervals of times during which direct control signaling is expected to be received at the first device from devices in the second group; and
adjust intervals of times during which the first device is configured to operate in an awake state to narrowly encompass the intervals of times during which the direct control signaling is expected to be received from devices in the second group;
wherein the first device operates in either the awake state or a sleep state, and wherein in the awake state and the sleep state the first device respectively does and does not monitor for direct control signaling from other devices.

28. The first wireless communication device of claim 24, wherein the message indicates the range of possible values for misalignment between the timing reference of a given group and the common timing reference, by indicating the maximum one of those possible values.

29. The first wireless communication device of claim 24, wherein the common timing reference is the timing reference of a certain one of the groups.

30. The first wireless communication device of claim 24:
wherein the message indicates for at least one of the groups different ranges of possible values for misalignment between the timing reference of that group and the common timing reference; and
wherein the different ranges are associated with different resources configured for transmitting control signaling directly between devices.

31. The first wireless communication device of claim 24, wherein the memory contains instructions executable by the processing circuitry whereby the first wireless communication device is configured to adjust the intervals of time by shortening the intervals of time during which the first device is configured to operate in the awake state as compared to before the first device determined or estimated the intervals of times during which the direct control signaling is expected to be received.

32. The first wireless communication device of claim 24, wherein the memory contains instructions executable by the processing circuitry whereby the first wireless communication device is further configured to, as a result of the adjustment to the intervals of time, preferentially operate the first device in the sleep state during intervals of time when the direct control signaling is not expected to be received at the first device.

33. The first wireless communication device of claim 24, wherein the memory contains instructions executable by the processing circuitry whereby the first wireless communication device is further configured to transition the first device to a sleep state earlier than nominally configured according to the adjustment, responsive to receiving and decoding direct control signaling during an interval of time when the first device is in the awake state.

34. The first wireless communication device of claim 24, wherein the memory contains instructions executable by the processing circuitry whereby the first wireless communication device is further configured to:
occasionally or periodically extend the intervals of time during which the first device is nominally configured to operate in the awake state according to the adjustment, such that those intervals of time no longer narrowly encompass the intervals of times during which the direct control signaling is expected to be received; and when direct control signaling is received during the extended intervals of time, readjust the intervals of time during which the first device is configured to operate in the awake state to narrowly encompass the intervals of time during which the direct control signaling is expected to be received, accounting for the direct control signaling received during the extended intervals of time.

35. The first wireless communication device of claim 24:
wherein, according to the adjustment, the first device is nominally configured to operate in an awake state during a periodically recurring time resource that narrowly encompasses the intervals of times during which the first device expects to receive direct control signaling; and
wherein the memory contains instructions executable by the processing circuitry whereby the first wireless communication device is further configured to:
  responsive to determining that no direct control signaling has been detected on the time resource for a defined amount of time, increase the periodicity of the time resource; and
  responsive to detecting that direct control signaling has been restarted on the time resource, decrease the periodicity of the time resource.

36. The first wireless communication device of claim 24, wherein the groups correspond to different clusters of devices, each cluster having a cluster head that is a device belonging to the cluster and that assigns resources on which the devices in the cluster are to transmit direct control signaling to other devices.

37. The first wireless communication device of claim 24, wherein the wireless communication system comprises a cellular communication system, the system including radio network nodes that provide radio coverage for devices in respective cells, wherein the groups correspond to different cells in the system.

38. The first wireless communication device of claim 25, wherein the memory contains instructions executable by the processing circuitry whereby the first wireless communication device is further configured to estimate the intervals of time by:
  identifying the direct control signaling received from the second device as having been received from a device in the second group, based on extracting an identity of the second group from the direct control signaling;
  deriving a timing reference, or range of possible timing references, of the second group from the timing with which the direct control signaling was received from the second device; and
  performing the estimating based on an assumption that devices in the second group transmit direct control signaling according to the derived timing reference, or range of possible timing references.

39. The first wireless communication device of claim 25, wherein the memory contains instructions executable by the processing circuitry whereby the first wireless communication device is further configured to estimate the intervals of time by determining a range of possible values for misalignment between the timing references of the first and second groups, the range accounting for uncertainty in that misalignment.

40. The first wireless communication device of claim 39, wherein the memory contains instructions executable by the processing circuitry whereby the first wireless communication device is further configured to determine the range of possible values based on one or more of: a margin of error allowed for devices in the first or second group to be considered as synchronized to the same timing reference; inherent propagation delay between a radio node associated with the first or second group and the devices in that group; and inherent propagation delay between devices in different groups.

41. The first wireless communication device of claim 40, wherein the memory contains instructions executable by the processing circuitry whereby the first wireless communication device is further configured to determine the range of possible values by determining a portion of the range of possible values for misalignment based on a communication protocol employed for communication in and/or between the different groups.

42. The first wireless communication device of claim 25, wherein the memory contains instructions executable by the processing circuitry whereby the first wireless communication device is configured to adjust the intervals of time by shortening the intervals of time during which the first device is configured to operate in the awake state as compared to before the first device determined or estimated the intervals of times during which the direct control signaling is expected to be received.

43. The first wireless communication device of claim 25, wherein the memory contains instructions executable by the processing circuitry whereby the first wireless communication device is further configured to, as a result of the adjusting, preferentially operate the first device in the sleep state during intervals of time when the direct control signaling is not expected to be received at the first device.

44. The first wireless communication device of claim 25, wherein the memory contains instructions executable by the processing circuitry whereby the first wireless communication device is further configured to transition the first device to a sleep state earlier than nominally configured according to the adjustment, responsive to receiving and decoding direct control signaling during an interval of time when the first device is in the awake state.

45. The first wireless communication device of claim 25, wherein the memory contains instructions executable by the processing circuitry whereby the first wireless communication device is further configured to:
  occasionally or periodically extend the intervals of time during which the first device is nominally configured to operate in the awake state according to the adjustment, such that those intervals of time no longer narrowly encompass the intervals of times during which the direct control signaling is expected to be received; and
  when direct control signaling is received during the extended intervals of time, readjust the intervals of time during which the first device is configured to operate in the awake state to narrowly encompass the intervals of time during which the direct control signaling is expected to be received, accounting for the direct control signaling received during the extended intervals of time.

46. The first wireless communication device of claim 25:
wherein, according to the adjusting, the first device is nominally configured to operate in an awake state during a periodically recurring time resource that narrowly encompasses the intervals of times during which the first device expects to receive direct control signaling; and wherein the memory contains instructions executable by the processing circuitry whereby the first wireless communication device is further configured to:
- responsive to determining that no direct control signaling has been detected on the time resource for a defined amount of time, increase the periodicity of the time resource; and
- responsive to detecting that direct control signaling has been restarted on the time resource, decrease the periodicity of the time resource.

47. The first wireless communication device of claim 25, wherein the groups correspond to different clusters of devices, each cluster having a cluster head that is a device belonging to the cluster and that assigns resources on which the devices in the cluster are to transmit direct control signaling to other devices.

48. The first wireless communication device of claim 25, wherein the wireless communication system comprises a cellular communication system, the system including radio network nodes that provide radio coverage for devices in respective cells, wherein the groups correspond to different cells in the system.

\* \* \* \* \*

UNITED STATES PATENT AND TRADEMARK OFFICE
CERTIFICATE OF CORRECTION

PATENT NO. : 9,560,614 B2
APPLICATION NO. : 14/405051
DATED : January 31, 2017
INVENTOR(S) : Sorrentino et al.

It is certified that error appears in the above-identified patent and that said Letters Patent is hereby corrected as shown below:

In the Drawings

In Fig. 3, Sheet 3 of 8, delete "[image of box with text: Receive a message that indicates, for each of one or more of the groups, a range of possible values for misalignment between the timing reference of that group and a common timing reference, where such range accounts for uncertainty in that misalignment 110]" and insert --[image of box with text: Receive a message that indicates, for each of one or more of the groups, a range of possible values for misalignment between the timing reference of that group and a common timing reference, where such range accounts for uncertainty in that misalignment 110]--, therefor.

In the Specification

In Column 5, Line 55, delete "devices 12" and insert -- devices 14 --, therefor.

In Column 5, Line 62, delete "devices 12" and insert -- devices 14 --, therefor.

In Column 8, Line 13, delete "devices 12" and insert -- devices 14 --, therefor.

In Column 14, Line 13, delete "FIGS." and insert -- FIG. --, therefor.

In Column 14, Line 27, delete "FIGS." and insert -- FIG. --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*